United States Patent [19]
Markus et al.

[11] Patent Number: 5,729,981
[45] Date of Patent: Mar. 24, 1998

[54] METHOD AND APPARATUS FOR EXTRACTING WATER

[76] Inventors: Wolfgang Markus, Düsseldorfer Landstr. 331, 47259 Duisburg, Germany; Michael Braun, Römerweg 8, 47647 Kerken, Germany

[21] Appl. No.: 619,772
[22] PCT Filed: Oct. 10, 1994
[86] PCT No.: PCT/DE94/01186
§ 371 Date: Mar. 22, 1996
§ 102(e) Date: Mar. 22, 1996
[87] PCT Pub. No.: WO95/10342
PCT Pub. Date: Apr. 20, 1995

[30] Foreign Application Priority Data
Oct. 9, 1993 [DE] Germany .............. 43 34 457.7

[51] Int. Cl.⁶ .............. B01D 5/00; E03B 3/28
[52] U.S. Cl. .............. 62/3.4; 62/331; 62/235.1; 62/236; 62/93
[58] Field of Search .............. 62/93, 97, 3.2, 62/3.3, 3.4, 3.7, 235.1, 236, 271, 331, DIG. 22

[56] References Cited

U.S. PATENT DOCUMENTS

| | | |
|---|---|---|
| 2,944,404 | 7/1960 | Fritts .............. 136/203 |
| 3,040,538 | 6/1962 | Alsing .............. 62/3.4 |
| 3,441,449 | 4/1969 | Green .............. 62/3.4 |

FOREIGN PATENT DOCUMENTS

| | | |
|---|---|---|
| 3830647 | 3/1990 | Germany . |
| 3936977 | 5/1991 | Germany . |
| 4132916 | 4/1993 | Germany . |

*Primary Examiner*—William Doerrler
*Attorney, Agent, or Firm*—Richard A. Speer; Daniel J. Hulseberg; Mayer, Brown & Platt

[57] ABSTRACT

The invention relates to a method of extracting water from the ambient air by condensation of air moisture, characterized in that a heat-insulating partition is cooled on one side and heated on the other side by external supply of energy, creating a natural convective air draft on the heated side of the partition, the convective air draft being channelled substantially like a chimney draft and used to recover part of the energy while water is extracted on the cooled side by condensation of air moisture. The invention further relates to an apparatus for carrying out said method. The object underlying the invention is to ensure an appropriate afflux of air and a high degree of efficiency by optimum exploitation of energy.

12 Claims, 2 Drawing Sheets

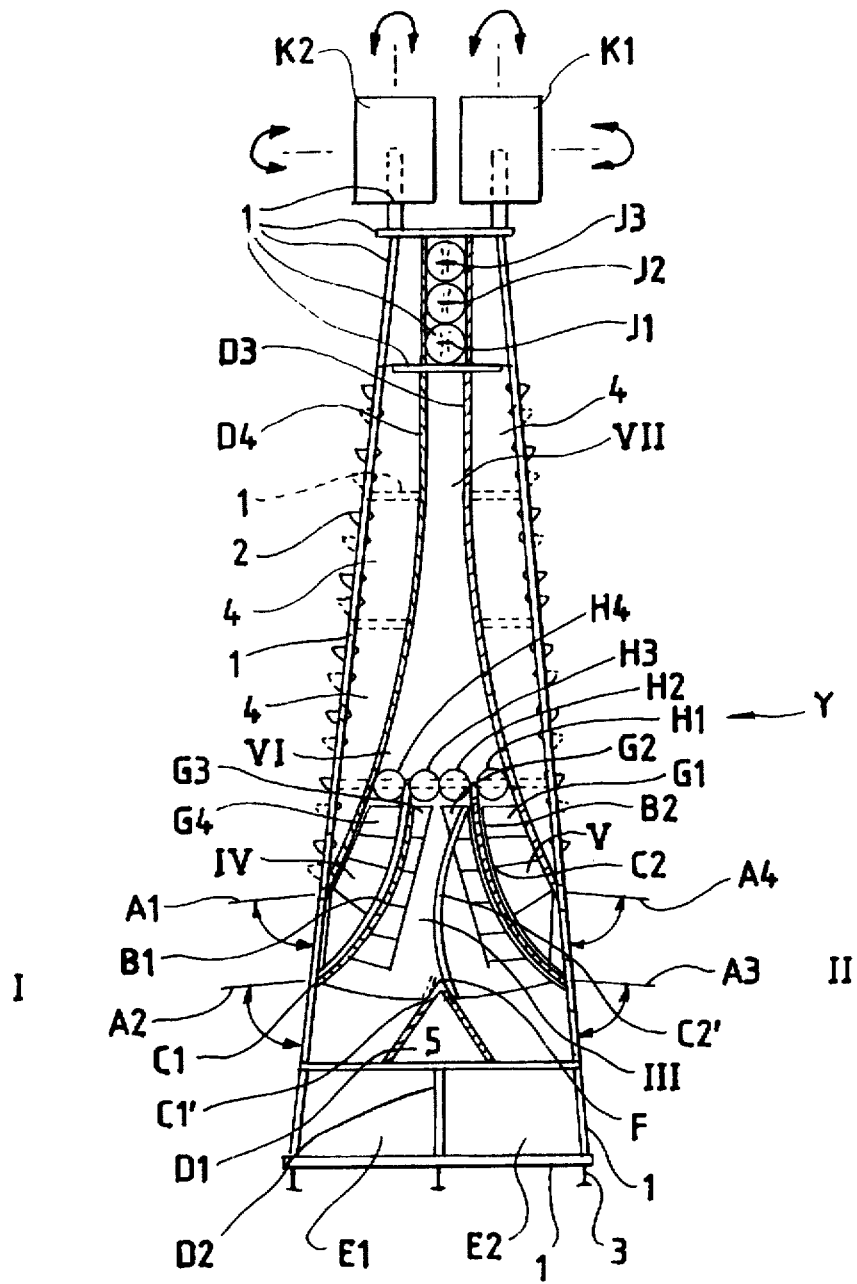

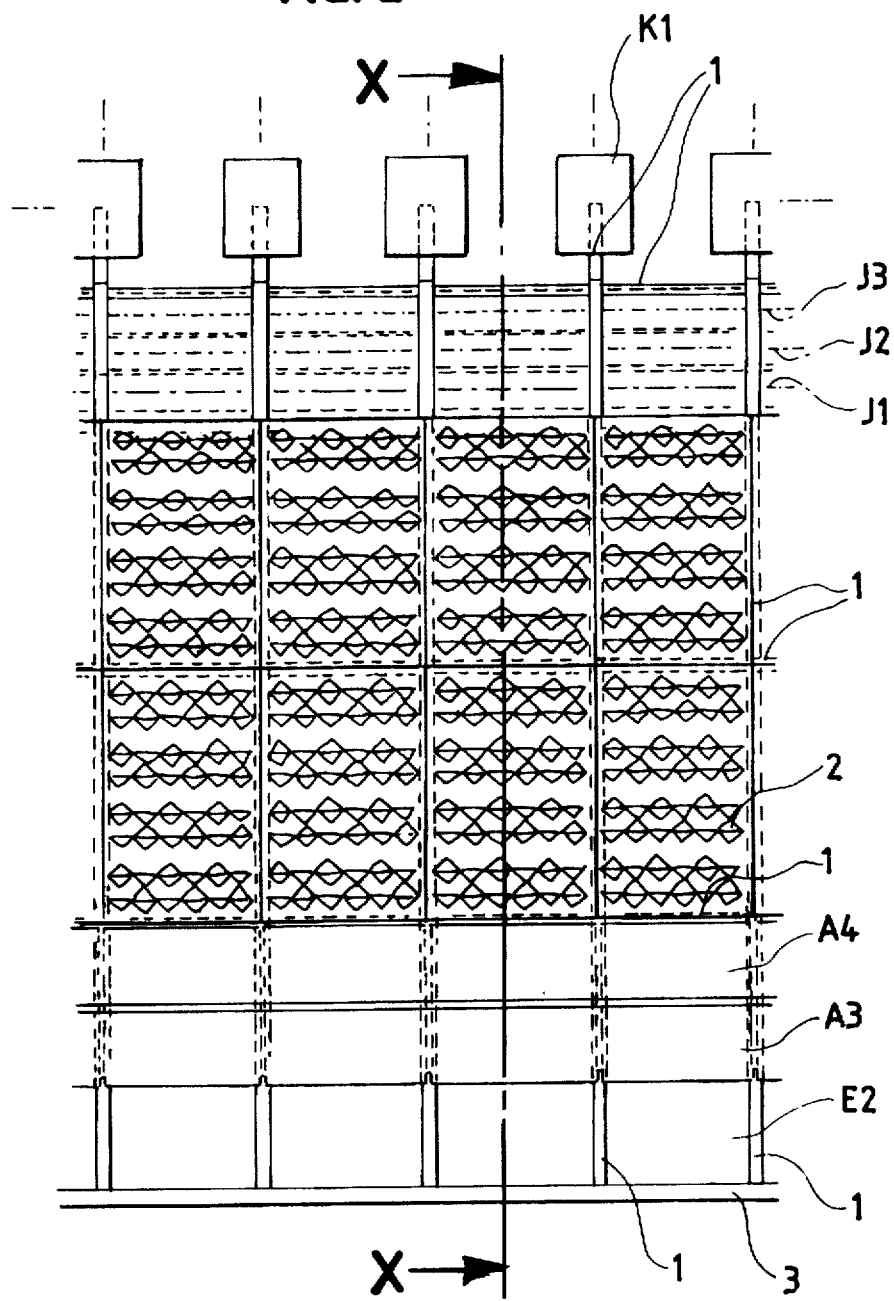

METHOD AND APPARATUS FOR EXTRACTING WATER

The invention relates to a method and apparatus for extracting water from ambient air by condensation of air moisture.

In arid areas of southern Europe, for example, or in other regions of the world, there is the problem that the aridity allows only very limited vegetation and causes the landscape to become a steppe. To obviate this process, methods and apparatus have been suggested to extract water from the ambient air by condensation of air moisture. In conventional water extraction devices, a cooling element is energized to cool condensation surfaces for condensing air moisture, while another surface dissipates into the atmosphere the heat drawn from the cooling surface. Hitherto, however, the heat thus produced and dissipated into the atmosphere has not been used to recover part of the energy required for the cooling operation of the cooling element. On the contrary, a lot of designs have rather consumed additional energy, for instance by means of fans, to dissipate the heat into the atmosphere.

Due to this unexploited dissipation of heat energy, the efficiency of the prior art designs has been reduced, which means that only a small quantity of water has been able to be extracted despite relatively high energy consumption.

Another problem in conventional water-extraction devices has resulted from their failure to ensure a sufficient natural air draft for supplying the fresh air from which the moisture is subsequently to be extracted by condensation.

The object underlying the invention is to provide a method and apparatus for extracting water from the ambient air by condensation of air moisture such as to achieve a high degree of efficiency and to ensure a natural draft for supplying fresh air without any additional expenditure.

According to the method of the invention, this object is achieved by a heat-insulating partition that is cooled on one side and heated on the other side by external supply of energy, creating a natural convective air draft on the heated side of the partition, the convective air draft being channelled substantially like a chimney draft and used to recover part of the energy while water is extracted on the cooled side by condensation of air moisture.

The apparatus according to the invention, for carrying out the method of the invention, is designed such that at least one partition made of a heat-insulating material is provided for separating a cold air space from a warm air space, said partition leading into a chimney and being provided with heating means on one side of the partition and with cooling means on the other side of the partition, said partition being positioned and oriented such that a natural convective air draft is created on the side of the heating means and extends into the chimney thus causing ambient air to be supplied to the apparatus, turbines and generators being arranged in the air draft for producing energy from the air flow.

Thus, with the help of this method and apparatus, the heated side is specifically used to pass fresh air into the apparatus for extracting water. Moreover, the method and apparatus enable the warm air to be discharged in a natural way, i.e., without using additional fans. A further essential advantage resides in that part of the energy released on the warm-air side of the partition is recovered with the help of generators arranged in the natural air draft. In this manner, the efficiency can be increased, i.e., a considerable amount of water can be condensed while providing a relatively low energy supply.

In so doing, natural wind may be advantageously used in addition to the natural convective draft in order to supply ambient air and to produce energy.

Advantageously, solar energy and/or wind energy converted into electrical energy is used for the heating of the one side of the partition and for the cooling of the other side of the partition. It is also possible, however, to provide a connection to the general electricity mains to implement the cooling or heating of the respective partition sides. The solar energy or wind energy may also be buffered with the help of a storage battery in order to perform the condensation at a suitable time, for instance during the night instead of the daytime, when there is already a tendency towards dew formation, hence condensation, owing to the cooling of the warm air as the radiation from the sun ceases.

It is particularly advantageous that the heating means as well as the cooling means are formed by Peltier elements embedded in heat-insulating, compartmentalised double-plates made of a plastics material, the cooling end of each Peltier elements projecting from the associated double-plate on the cooling side of the projecting from the associated double-plate on the heating side of the partition. These Peltier elements provide the advantage that they are of a very simple shape and work reliably while being very compact so that they can be readily integrated into a partition such as a compartmentalized double-plate made of plastics. Generally, however, a combination of heating and cooling means for carrying out the invention can be realized in any possible way, for instance by a different heat pump process using a compressor such as in refrigerators.

According to another advantageous embodiment of the invention, two partitions are provided and each partition partly confines an intake air opening towards the warm air space and an intake air opening towards the cold air space on one side of each opening, and the ends of the partitions opposite to the intake air openings lead into a chimney in which turbines and generators are arranged for producing energy. Generally, however, any type of generators may be used for recovering the heat from the warm-air space and/or the resulting kinetic energy of the convective air flow. As regards the air flow, channelling the same by means of the chimney is particularly advantageous in that the air flow is accelerated owing to the chimney advantageously narrowing towards the top, and thus attains a velocity sufficiently high to drive generators.

Advantageously, the partitions are formed as flexible and adjustable partition tongues allowing to modify the proportion of the size of the intake air opening towards the cold air space with respect to the size of the intake air opening towards the warm air space. Owing to this design, the condensation conditions can be set to an optimum, and furthermore natural ambient wind can be exploited in an optimal manner and guided into the apparatus of the invention, while the air to be cooled for condensing liquid water may enter the cold air space on the lee side, for example. The cold air draft may be advantageously provided by the warm air entraining a limited amount of cold air into the chimney owing to the slightly low pressure produced at the entry of the cold air current. Moreover, the fresh air to be cooled for condensation purposes may also be conducted into the apparatus of the invention by natural wind.

According to an advantageous embodiment of the invention, turbines and generators for producing energy are arranged at the places where the partitions extend into the chimney, wherein the turbines when energized can also be operated as fans for improving the air draft. This embodiment yields the advantage that—depending on the ambient conditions—either additional energy can be recovered or an optimal air flow can be set when external energy is supplied. Basically, however, appropriate valves may be provided instead of the devices operable as turbines or pumps, in order to control the air flow in any desired fashion.

Advantageously, the energy required for condensing liquid water is produced by providing solar cells and/or wind wheels to generate the electrical energy for operating the Peltier elements.

According to a particularly preferred embodiment, the apparatus of the invention is designed such that around the chimney a cavity is provided filled with bulk material, for instance earth, suitable as a nutritive substrate for plants. In this way, the apparatus may be designed even as a wall module which can be provided with vegetation, wherein the water necessary for plant growth is directly extracted by the apparatus of the invention in the form of a wall module, which renders external watering dispensable.

Collecting containers for collecting the extracted condensation water may be arranged beneath the partitions in order to collect the extracted water.

A preferred exemplary embodiment of the invention will be described below having reference to the drawings wherein FIG. 1 is a sectional view designated X—X in FIG. 2; and FIG. 2 is a side elevational view designated Y in FIG. 1.

As shown in FIG. 1, the apparatus for extracting water comprises a housing which in this embodiment is constituted by steel sheet profiles and steel angles forming a support structure 1. This support structure 1 carries wall covering elements 2 which can hold vegetation and are made of a reusable plastics material.

The lower part of the apparatus is provided with a steel girder base structure 3 allowing the apparatus to be mounted in a stable manner and in horizontal orientation. Further, a chimney VII is provided narrowing towards the top and extending vertically in the centre of the steel structure. A cavity is formed around the chimney VII between the wall covering elements 2 and the chimney VII; said cavity can be filled with bulk material 4, such as humus, peat and compost, to establish a basis for growing plants.

The partitions C1 and C2 are provided in the lower section of the apparatus and have the shape of tongues for limiting the air spaces; the partitions consist of heat-insulating compartmentalized double-plates made of a plastic material, and can be displaced by moving them toward a triangular structure 5 or away therefrom, respectively, as designated by the reference signs C1', C2' indicating displaced positions of the partitions C1 and C2. The reference signs D1, D2, D3, D4 each denote heat-insulating compartmentalised double-plates; the heat-insulating triangular structure 5 is also made of such double-plates.

Adjustable intake air flaps A1, A2, A3, A4 are provided for allowing the entry of air into the warm air space IV formed between the double-plate D4 and the partition C1, into the warm air space V formed between the double-plate D3 and the partition C2, and into the cold air space III formed between the partitions C1 and C2. The aforementioned warm and cold air spaces lead to a mixture space VI, after the respective air has passed through the devices H1, H2, H3 and H4, which are operable as turbines or fans.

The partitions C1, C2 are equipped with Peltier elements B1, B2, the cooling ends of which project from the associated partition C1, C2 into the cold air space III, while the warm ends of the Peltier elements B1, B2 extend into the respective warm air spaces IV, V.

The water condensing on the cold side of the partitions is collected in water-collecting containers E1, E2, which comprise a controllable outlet and a level detector and may be heat-insulated. The water can be fed into the bulk material 4 by means of a pump not shown. Depending on the direction from which the air current flows towards the apparatus of the invention, the water already extracted may be circulated from one collecting container into the other container on the lee side, for instance with the help of a pump not shown.

The partitions C1 and C2 are connected to respective light copper-tube structures G1, G2, G3, G4 which are in heat-conductive contact with the Peltier elements to ensure optimum heat conductivity implementing the cooling and convection; for this purpose, it is additionally possible to braid copper wires around the copper-tube structures.

At the places where the warm air spaces IV and V and the cold air space III lead into the mixture space VI, devices H1, H2, H3, H4 are provided which can be selectively operated as turbines or fans. With the help of these devices, part of the energy required for the Peltier elements can be recovered when the devices are operated as turbines or generators, or the air flow can be specifically controlled when the devices are operated as fans.

Moreover, turbines J1, J2, J3 coupled to generators are provided in the upper part of the chimney allowing to recover part of the energy required for the Peltier elements; for this purpose, the warm air flow is used which rises from the warm air spaces IV, V and extends through the chimney VII.

The total energy required for the apparatus is at least partly produced with the help of solar energy means K1, K2 controllable in two axes. These solar energy means comprise a control unit and are connected to an energy buffer such as a storage battery.

When the apparatus is in operation, the air flaps A1 to A4 and the partitions C1 and C2 can be pivoted to control the entry of air, in dependence on the presence of ambient wind, for example. In a maximum position, the entry of air from one side of the apparatus—for instance from the air space II—into the cold air space III may be completely shut by making the partition C2 abut on a seal F in the position C2' of said partition, which seal F is formed on the triangular structure 5. In this case, air to be cooled can pass into the apparatus only from the other side, i.e. from the air space I in this example. Such an arrangement can provide improved energy exploitation, for instance in dependence on the direction of the wind, for which purpose the device Hi may be used as a turbine.

The warm air current from the warm air spaces IV and V entrains a small amount of air from the cold air space III at their junction with the mixture space VI, in the manner of a water jet pump, thus also ensuring an appropriate afflux of fresh air, from which water is to be extracted, independently of the direction of the wind.

We claim:

1. A method of extracting water from ambient air by condensation of air moisture, the method comprising the steps of:

providing a heat-insulating partition for separating a cold air space from a warm air space;

cooling one side of the partition and heating the other side using an external supply of energy, the cooled side and the heated side of the partition being connected to each other technically by a device selected from a group including a heat pump and a Peltier element;

leading an air stream is to the heat-insulating partition to separate the air stream into a warm air stream and a cold air stream, thus creating a natural convective air draft on the heated side of the partition, the convective air draft being channelled substantially as a chimney draft and used to recover part of the energy used while water is extracted on the cooled side by condensation of air moisture; and reunifying the warm air stream and the cold air stream after passing the partition.

2. The method according to claim 1, wherein the partial recovery of energy by said air draft is achieved using turbines and generators.

3. The method according to claim 1 or 2, wherein natural wind is used in addition to the natural convective air draft to supply ambient air and to produce energy.

4. The method according to claim 3, wherein the external supply of energy is obtained from a group including solar energy and wind energy converted into electrical energy and is used for the cooling of the one side of the partition and for the heating of the other side of the partition.

5. An apparatus for extracting water from ambient air by condensation of air moisture, the apparatus comprising at least one partition made of a heat-insulating material to separate a cold air space from a warm air space, said partition leading into a chimney and being provided with heating means on one side of the partition and with cooling means on the other side of the partition, the cooled side and the heated side of the partition being connected to each other technically by a device selected from a group including a heat pump and a Peltier element, said partition being positioned and oriented such that an air stream, led to the heat-insulating partition, is separated into a warm air stream and a cold air stream, the warm air stream and the cold air stream being reunified after passing the partition such that a natural convective air draft is created on the side of the heating means and extends into the chimney thus causing ambient air to be supplied to the apparatus, turbines and generators being arranged in the air stream for producing energy therefrom.

6. The apparatus according to claim 5, wherein the heating means as well as the cooling means are formed by Peltier elements embedded in heat-insulating, compartmentalized double-plates made of a plastics material, the cooling end of each Peltier element projecting from the associated double-plate on the cooled side of the partition, and the heating end of each Peltier element projecting from the associated double-plate on the heated side of the partition.

7. The apparatus according to claim 5 or 6, wherein two partitions are provided and each partition partly confines an intake air opening towards the warm air space and an intake air opening towards the cold air space on one side of each opening, the ends of the partitions opposite to the intake air openings leading into the chimney in which the turbines and generators are arranged for producing energy.

8. The apparatus according to claim 7, wherein the partitions are formed as flexible and adjustable partition tongues allowing the proportion of the intake air opening towards the cold air space to be modified with respect to the intake air opening towards the warm air space.

9. The apparatus according to claim 7, wherein the turbines and generators for producing energy are arranged where the partitions extend into the chimney, such that the turbines when energized can also be operated as fans for improving the air draft.

10. The apparatus according to claim 6, wherein a device selected from a group including solar cells and wind wheels is provided to produce the electrical energy for operating the Peltier elements.

11. The apparatus according to claim 7, wherein a cavity is provided around the chimney and filled with bulk material suitable as a nutritive substrate for plants.

12. The apparatus according to claim 5, wherein collecting containers for collecting the extracted condensation water are arranged beneath the partitions.

* * * * *